No. 768,254.                                                                 Patented August 23, 1904.

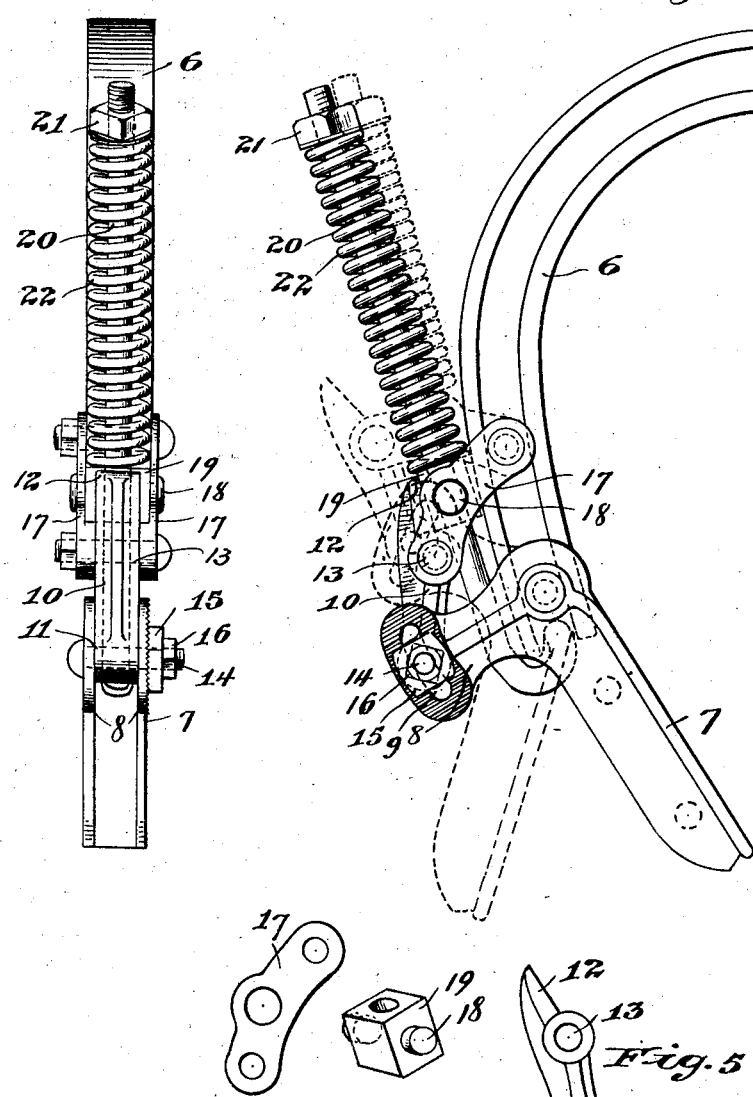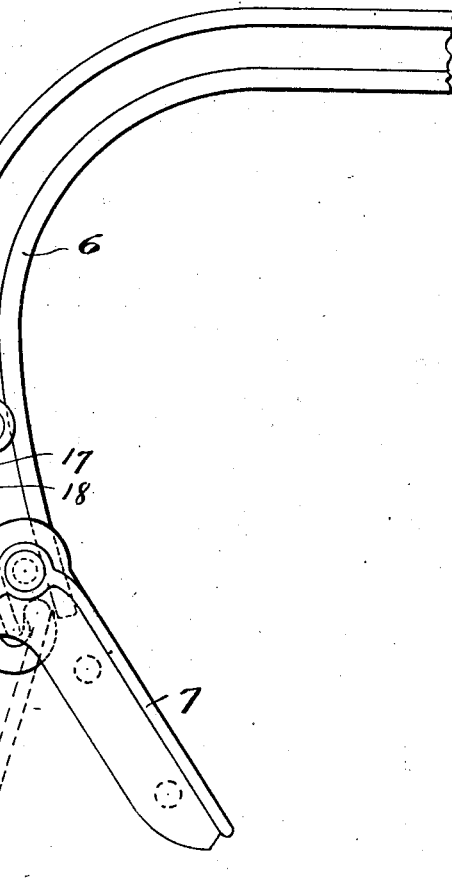

UNITED STATES PATENT OFFICE.

IRA A. WEAVER, OF SPRINGFIELD, ILLINOIS, ASSIGNOR TO RACINE-SATTLEY COMPANY, OF SPRINGFIELD, ILLINOIS, A CORPORATION OF ILLINOIS.

SPRING-TRIP FOR CULTIVATORS.

SPECIFICATION forming part of Letters Patent No. 768,254, dated August 23, 1904.

Application filed March 10, 1904. Serial No. 197,543. (No model.)

*To all whom it may concern:*

Be it known that I, IRA A. WEAVER, a citizen of the United States, residing at Springfield, in the county of Sangamon and State of Illinois, have invented certain new and useful Improvements in Spring-Trips for Cultivators, of which the following is a specification.

Cultivator-shovels are ordinarily mounted on shanks which are pivoted to the beam, the parts being normally so held and connected as to prevent the shovel yielding to the ordinary obstructions encountered in plowing, but the connection being such that the shovels may yield or trip when they encounter such an obstruction or obstacle as would break the shovel or bend the shank or beam if the shovel could not yield. To obviate the dangers of breaking or bending, it is customary to employ a yielding connection, such as a brake-pin or a spring. The latter form of construction, called a "spring-trip," usually comprises a bracket on the beam, a crank on the shovel shank or sleeve, a toggle-joint connecting the bracket and the sleeve or shank, and a spring tending to straighten the toggle, and thus hold the shovel in operative position.

My invention relates to an improved construction of spring-trip and is illustrated in the accompanying drawings, in which—

Figure 1 is a view in side elevation, showing the shovel-beam partly broken away, the shank and trip mechanism being shown in full lines and a secondary position of the shank and trip being shown in dotted lines. Fig. 2 is a rear edge view. Figs. 3, 4, and 5 are details.

In the drawings, 6 represents the shovel-beam, having a shank 7 pivoted thereto. The shank has a lateral extension in the form of a bifurcated crank-arm 8, slotted, as at 9, and one bifurcation being corrugated along the margins of the slot.

10, Fig. 5, represents the lower toggle member, having an aperture 11 in its lower end to receive a pivot-pin and an extension 12 beyond its upper pivot-aperture 13 and which is secured to the furcations of the crank-arm 8 by a pivot-pin 14, corrugated washer 15, and nut 16, so that it may be adjusted to vary the setting of the toggle. The upper member of the toggle is composed of two plates 17 17, Fig. 3, which are pivoted at their lower ends to the toggle member 10, at their upper ends to the beam, and at their middle portions on bosses or lugs 18 on block 19, Fig. 4. The block 19 is apertured to provide for the passage therethrough of a tension-rod 20, having its lower end hooked to engage a seat in the end of the shovel-beam and provided at its upper end with a nut 21. A coiled spring 22 surrounds the rod and bears at its lower end upon the block and at its upper end upon the nut.

In the normal working of the device the parts are in the position shown by the full lines in Fig. 1, the middle joint of the toggle being slightly out of line with the end joints and the spring bearing upon the middle joint of the toggle through the block, thus tending to prevent the flexing of the toggle. Should the shovel encounter an unusual obstruction, its shank will rock on its pivot toward the position indicated by the dotted line in Fig. 1, thus breaking the toggle and compressing the spring and the various parts of the trip assuming the position shown by the dotted lines. In the normal or working position the extension 12 on the lower toggle member 10 contacts the rear face of the block and prevents the breaking of the toggle inwardly.

The adjustable connection between the lower member of the toggle and the crank-arm of the shank enables the shank to be normally set in the proper position and also provides means of compensation within limited range for any variations in the relation of the parts due to the bending or springing of the shank or of the beam.

It will be observed that the trip mechanism is practically self-contained in that its several parts, including the spring and its bearings, are all mounted on the upper member of the toggle, the extremities of the toggle members being connected, respectively, to the beam and the crank-arm of the shank. This results in economy of construction and in case of an accidental springing of the shank or beam enables the trip to be adjusted to this changed condition. When the shovel encounters an obstruction, the spring is of course compressed; but the maximum compression is not attained until the toggle members have gained considerable leverage by reason of the upward movement of the middle joint of the toggle, and when the obstruction is passed the spring by its stored power returns the parts to the normal position. It will be observed that the block 19 is permitted to rock, so that the spring is compressed without torsion.

I have shown the trip applied to a curved shovel-beam; but obviously it might be applied to a straight beam.

I claim—

1. In a spring-trip for cultivators, the combination with toggle members adapted to be pivotally connected to the beam and to the shank, of a spring bearing upon one of said toggle members and a rod bearing upon the opposite end of the spring and engaging the beam adjacent to the pivot of the shank, substantially as described.

2. The combination with a plow-beam, of a shovel-shank pivoted thereto and having a crank-arm, a spring-trip comprising toggle members pivotally connected to the beam and to said crank-arm, a spring having a bearing at one end upon one of the toggle members and a rod connected to the spring and engaging the beam below the pivot of the shank, substantially as described.

3. In a spring-trip for cultivators, the combination with the beam of a shovel-shank pivotally connected thereto, a crank-arm rigid with the shovel-shank, a toggle device having one of its members adjustably and pivotally connected to said crank and its other member pivotally connected to the beam, a bearing-block pivotally mounted in one of the toggle members, a tension-rod passing through said block and engaging the beam below the shank-pivot, a compression-spring surrounding said rod and bearing at one end on the block, and means on the rod for confining the spring, substantially as described.

4. In a spring-trip for cultivators, the combination with the shovel-beam of a shovel-shank pivoted thereto and having a slotted crank-arm rigid therewith, a toggle member pivotally connected to the slotted arm, a second toggle member pivotally connected to the beam, a stop to limit the inward movement of the toggle, a compression-spring bearing upon one of the toggle members and a tension-rod connected with the beam adjacent to the pivot of the shank and bearing on said spring and normally tending to straighten the toggle, substantially as described.

IRA A. WEAVER.

Witnesses:
R. R. FREY,
T. P. LUBY.